UNITED STATES PATENT OFFICE.

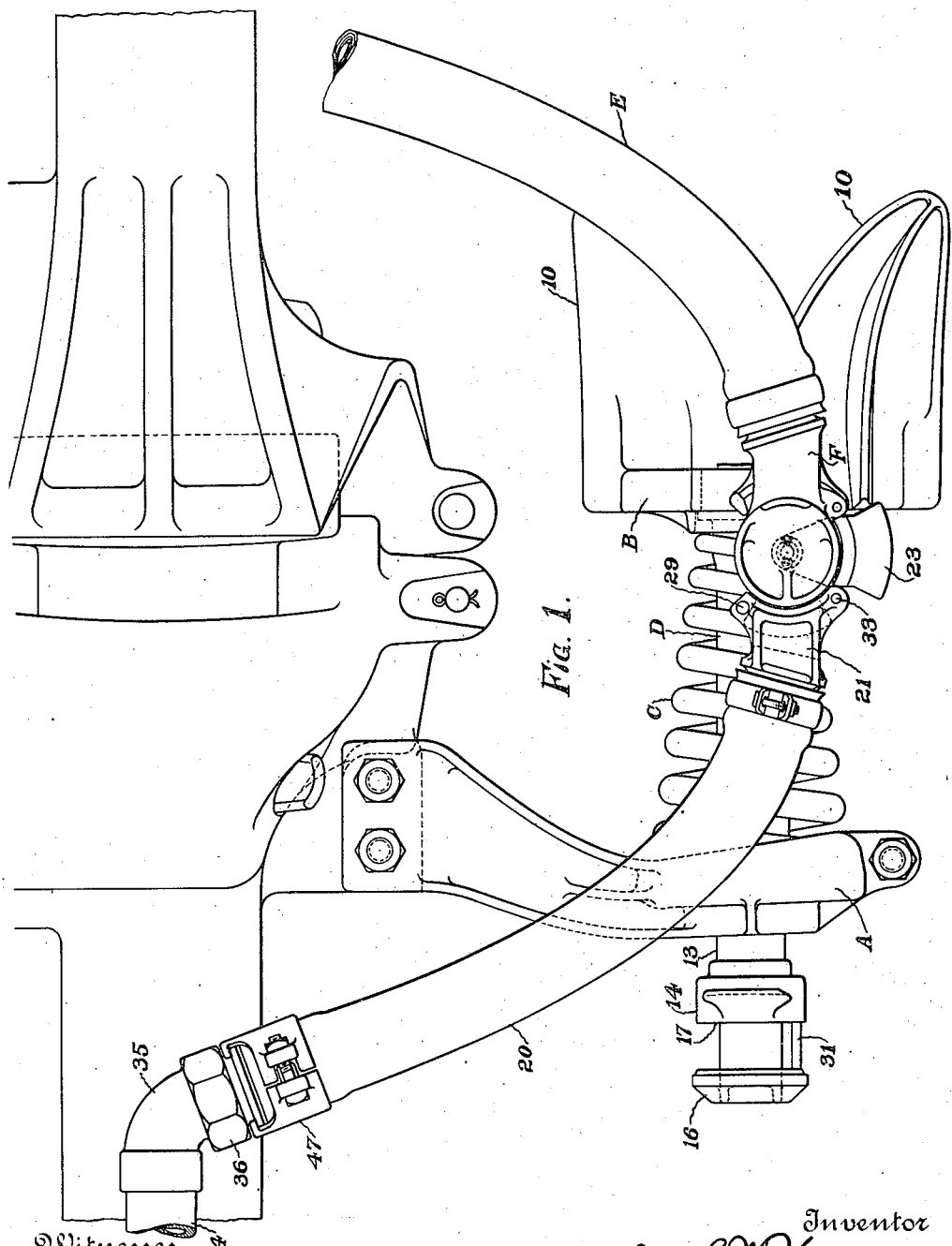

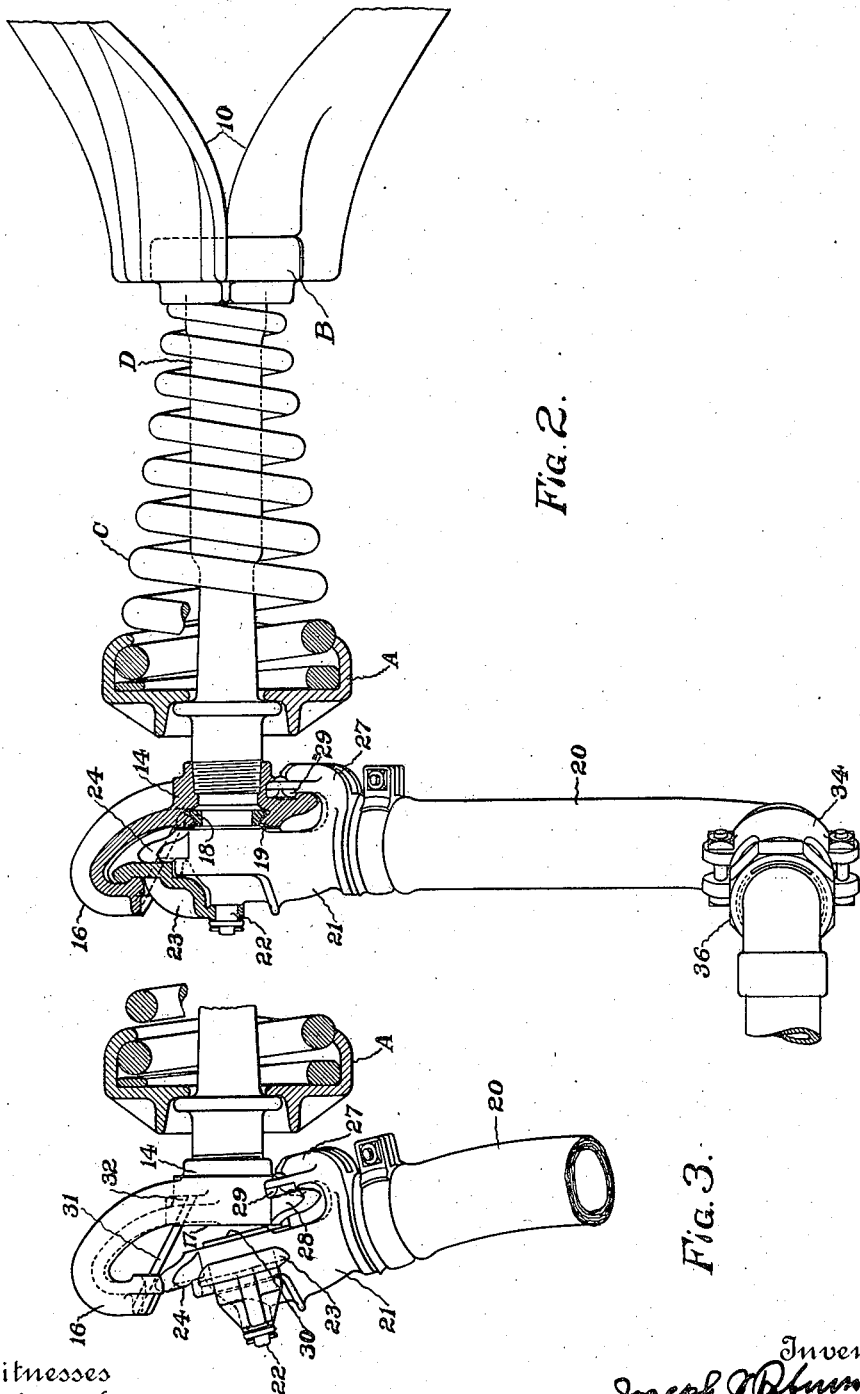

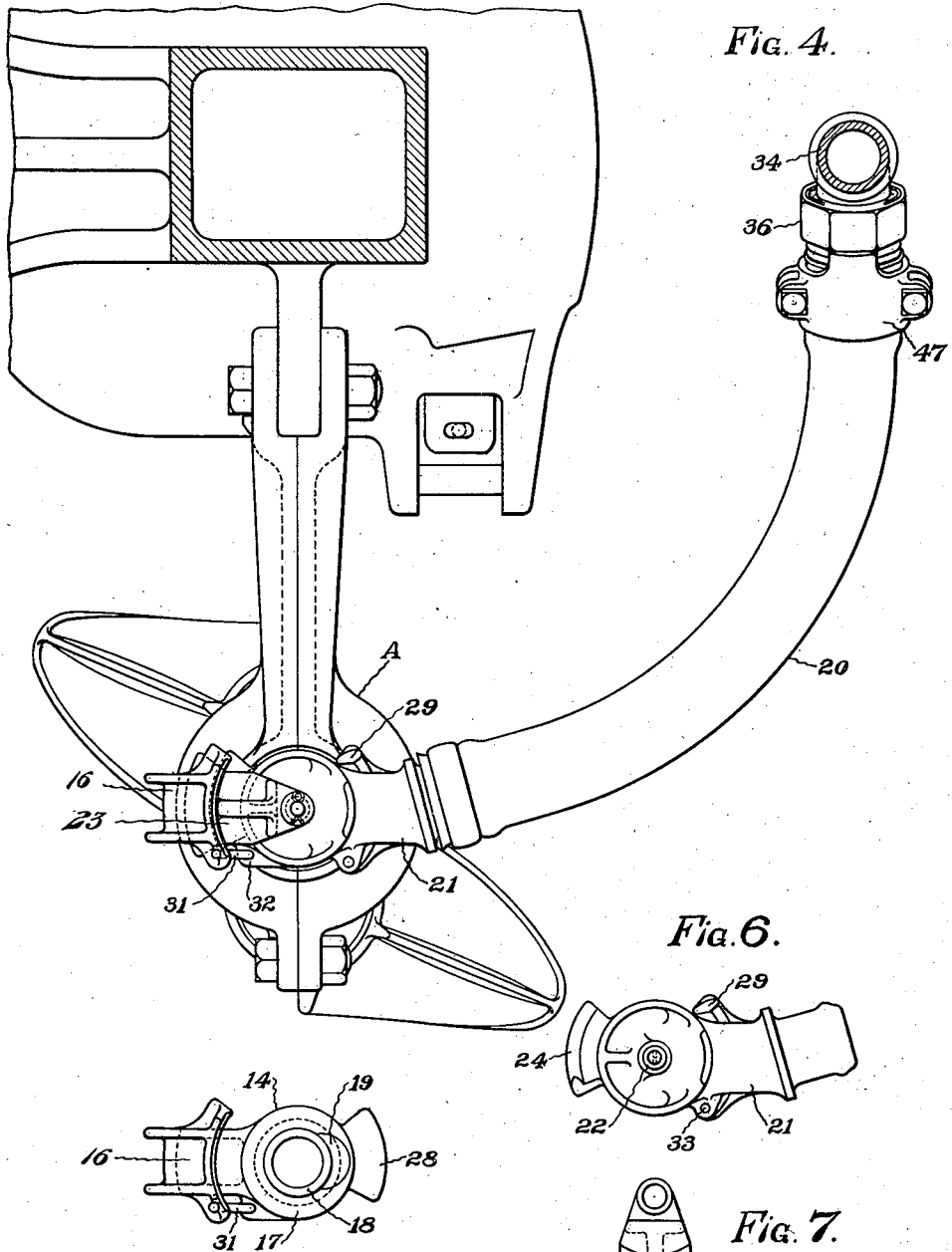

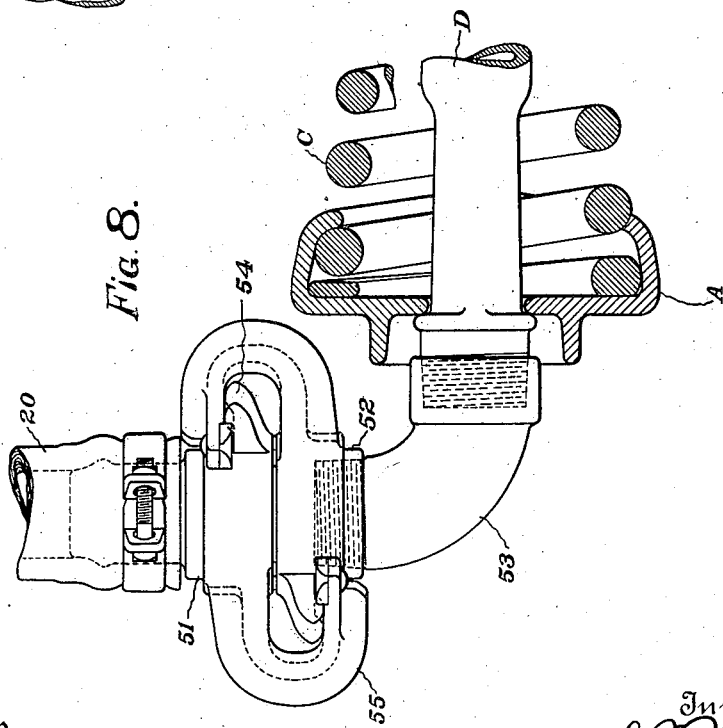

JOSEPH V. ROBINSON, OF CHEVY CHASE, MARYLAND.

AUTOMATIC TRAIN-PIPE CONNECTOR.

1,245,786.  Specification of Letters Patent.  Patented Nov. 6, 1917.

Application filed January 15, 1914. Serial No. 812,335.

*To all whom it may concern:*

Be it known that I, JOSEPH V. ROBINSON, a citizen of the United States, and resident of Chevy Chase, county of Montgomery, State of Maryland, have invented certain new and useful Improvements in Automatic Train-Pipe Connectors, of which the following is a specification.

My invention relates to an improved automatic train pipe connector, and it consists in the constructions, combinations and arrangements herein described and claimed.

An object of my invention is to provide a compact and efficient automatic train pipe connector, constructed to permit convenient and quick interchange connection of the train pipes of a car equipped with my device with the corresponding train pipe of a car not so equipped.

A further object of my invention is to provide a strong and simple construction of automatic train pipe connector, which will be durable and inexpensive in construction, and operate with certainty under all service conditions.

In the accompanying drawings:

Figure 1 is a side elevation illustrating one embodiment of my invention and showing the hose of a car not equipped with the automatic connector in interchange communication with the hose of a car having the automatic device.

Fig. 2 is a fragmentary plan view with parts in section, showing my improved connector with the hose of the car equipped coupled thereto.

Fig. 3 is a detail plan view, showing the initial position of the parts in coupling the hose of the car equipped with the automatic connector to the interchange head of the latter.

Fig. 4 is a rear elevation of the construction shown in Fig. 2.

Fig. 5 is a front face view of the interchange head of my improved connector.

Fig. 6 is a rear view of a standard type of hand-operated coupling section adapted to couple with the interchange head of my device.

Fig. 7 is a rear face view of the shiftable coupling means pivoted on the coupling section.

Fig. 8 is a fragmentary plan view, partly in section, of a slight modification.

Fig. 9 is a detail view, partly in section, showing the connection of a flexible hose length to the train pipe in my improved device.

Fig. 10 is an end view of the elbow connection shown in Fig. 9.

Fig. 11 is an end view of the swiveled nut shown in Fig. 9, and

Fig. 12 is a side view of the swiveled nut.

Referring to the drawings, B indicates the head of a well-known type of automatic connector, provided with guiding prongs 10 and having a tubular conduit D extending rearwardly through a supporting bracket A; said head B being yieldingly supported in position by a spring C. The bracket A is shown formed in two parts secured together and to the car in any suitable manner.

An interchange head 14 is secured to the end 13 of the conduit D at the rear of the bracket A; said head 14 being adapted to receive a standard hand-operated coupling section 21 and to be coupled to the latter by a latch 23 pivotally mounted on said section at 22.

As shown especially in Fig. 3, the overhanging flange 16 of the interchange head 14 is suitably formed and positioned to permit swinging of the coupling section 21 into coupling position on the interchange head without axial twisting or bending in the vertical plane of the train pipe hose 20 connected to said section 21; a tapered way 19 being provided in the coupling face 17 of the head 14 to facilitate such swinging or tilting of the section 21 into coupling position.

After the section 21 has been thus swung to coupling position on the head 14, said section and head are coupled together by shifting the pivoted latch 23 between the overhanging flange 16 of the head 14 and the usual flange 24 of the standard coupling section 21; the flanges 28 and 27 of said head and section, respectively, engaging in the usual manner.

In order to positively prevent accidental disconnection of the standard coupling section 21 from coupled engagement with the interchange head 14, I provide the usual overhanging flange 27 of said standard section 21 with a projection 29 adapted to lockingly engage the edge of the flange 28 of the interchange head 14 when said section and head are in proper coupled position; such interlocking of said projection 29 and flange 28 being maintained by the resiliency of the gaskets 18 and 30 carried by the head 14 and section 21, respectively, and the pressure of the fluid within the said head and section. It will be obvious that said projection 29 of the section 21 will in like manner interlock with the corresponding flange 24 of the standard hand-operated coupling section F when coupled in interchange with such section F of a car not equipped with an automatic connector, and be maintained in such position by the fluid pressure within the coupled train pipes and the resiliency of the gaskets in the section 21 and the hand operated coupling F.

The interchange head 14 is provided with a pin 31 which extends angularly from its flange 16 into its face 17; said pin constituting a stop for engaging the flange 24 of the section 21 and the latch 23 pivoted on said section, to limit the movement of said section and latch in coupling the parts together.

As shown especially in Fig. 9, the hose 20 has a fitting or thimble 45 extending from its free end, to which the hose is secured by a clamp 47. A head or nut 36 (see Figs. 9, 11 and 12) is rotatably mounted on the thimble 45 and provided with an interior seat 43 in engagement with an annular shoulder 46 on said thimble. A flange 48 on the clamp 47 engages an annular recess 49 in the nut 36 for confining said hose against axial shifting on the thimble; said shoulder 46 being constructed to permit the head or nut 36 to swivel relative to both the thimble or fitting 45 and clamp 47.

The nut 36 is provided with interrupted threads 41 and 42 adapted to screw on correspondingly interrupted threads 37 and 38 on an elbow connection 35 secured on the train pipe 34; a gasket 50 being seated in said connection 35 for engaging the thimble flange 46 when the hose 20 is secured to the train pipe 34 by the nut or head 36. This improved construction provides a strong and efficient means that will not leak, for detachably connecting the hose 20 to the train pipe.

Fig. 8 illustrates a modification in which a head 52 is connected to the rear end of the tubular conduit D with its coupling face extending in a plane substantially parallel to the axis of said conduit. The head 52 and the coupling section 51 are similar in design to the standard hand-operated coupling sections; whereby said section 51 is adapted for coupling with said head 52 or with the standard hand-operated coupling section of a car not equipped with an automatic connector. In this construction, the section 51 can be readily coupled to the interchange head 52 by slightly twisting the hose 20, or said section 51 can be carried back of the supporting bracket A and in similar manner coupled to the standard hand-operated coupling section of a car unequipped with an automatic connector.

From the foregoing description, it will be seen that my invention provides an especially simple, compact construction adapted for ready and efficient use in connecting a car equipped with an automatic connector with a car not so equipped, the connecting means being always in position on the connector, ready for instant service. If desired, the hose 20 may be employed entirely as an interchange device, and the automatic connector connected to the train pipe by suitable permanent or detachable connections.

I have illustrated preferred and satisfactory constructions, but changes could be made within the spirit and scope of my invention.

Having thus described my said invention, what I claim as new and desire to secure by United States Letters Patent is:

1. The combination with a train pipe, of a coupling member connected to the pipe and adapted to be coupled with a standard hand-operated coupling section, an automatic connector having a head adapted to receive said coupling member, and a latch on said member for locking the latter to said head.

2. The combination with a train pipe, of a coupling member connected to the pipe and adapted to be coupled with a standard hand-operated coupling section, an automatic connector having a head provided with a port adapted to register with a port in said coupling member, and a latch pivotally mounted on said member and adapted to secure the latter to said head.

3. The combination with a train pipe, of a coupling member connected to the pipe and adapted to be coupled with a standard hand-operated coupling section, an automatic connector having a head provided with a port adapted to register with a port in said coupling member, and means mounted on said coupling member and adapted to lock the same in operative relation to the head of the automatic connector.

4. The combination with a train pipe, of a coupling member connected to the pipe and adapted to be coupled with a standard hand-operated coupling section, an automatic connector having a head provided with a port adapted to register with a port in said coupling member, means for automatically engaging said head and member when the latter is in operative relation to the head, and a manually adjustable latch secured to the coupling member and adapted to engage said head.

5. In an automatic train pipe connector, the combination of a connector head, an interchange head connected therewith, a coupling section connected to the train pipe of the car, means shiftably mounted on said coupling section for coupling the latter to said interchange head, a resilient member positioned between said coupled section and head and adapted to be compressed, and coöperating parts on said coupling section and interchange head adapted to be automatically interlocked by the resiliency of said compressed member when said section and head are in the coupled position.

6. The combination with a conduit of an automatic train pipe connector, of a member mounted on said conduit and having a port communicating therewith, a gasket mounted in said port and arranged substantially concentric with the longitudinal axis of the conduit, a flexible pipe connected with a car train pipe and provided with a coupling adapted to engage said member on the conduit, and pivotally mounted means for locking said coupling and member together.

7. The combination with a conduit of an automatic train pipe connector, of a member connected to the conduit and having a face lying in a plane substantially at a right angle to the axis of the adjacent section of the conduit, a projection on said member, a flexible pipe connected with a car train pipe and provided with a coupling adapted to engage said member and including a projection that overlaps the projection on the conduit member when the coupling is engaged therewith, and means coöperating with said projections to lock the coupling and conduit member in engaging relation.

8. The combination with a conduit of an automatic train pipe connector, of a member connected with the conduit, a flexible pipe connected with a car train pipe and provided with a coupling adapted to engage a standard hand-car-hose coupling or said conduit member, and an adjustable projection on said coupling for securing the latter to said conduit member.

In testimony whereof, I have hereunto set my hand in the presence of two witnesses.

JOS. V. ROBINSON.

In the presence of—
KATHERINE V. BOSWELL,
M. C. SHERIDAN.